3,287,348
S-ALKYL-2-HALOETHYLSULFONIUM DYESTUFFS
David Taber, Pittsburgh, Pa., assignor to American Aniline Products, Inc., a corporation of Maryland
No Drawing. Filed Apr. 30, 1963, Ser. No. 277,017
5 Claims. (Cl. 260—180)

This invention relates to new dyestuffs and to the coloring of cellulosic and other textile materials therewith. In one specific aspect, it relates to new water-soluble dyestuffs having attached thereto at least one S-alkyl-2-haloethylsulfonium group.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group, e.g., sulfonic acid or carboxylic acid groups, to make them sufficiently water-soluble to be applied from an aqueous bath. The requirement for at least one sulfonic acid or carboxylic acid group thus imposes a limitation on the type of colored compounds that can be used to synthesize the dyestuffs.

I have found that unexpectedly superior water-soluble dyestuffs can be made from water-insoluble dyestuffs, free of ionogenic solubilizing groups, by alkylating water-insoluble dyestuffs containing at least one 2-haloethylthio group to make the corresponding sulfonium salts. My new dyestuffs, when applied to cellulose or other textiles by dyeing or printing in the presence of an acid-binding agent, give bright colorations which have good wash fastness.

It is, therefore, an object of the present invention to provide a new class of water-insoluble dyestuffs solubilized by the presence of at least one S-alkyl-2-haloethylsulfonium group.

In accordance with the invention I have discovered dyestuffs of the formula:

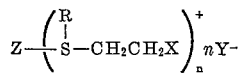

wherein Z is a water-insoluble colored moiety of the azo, anthraquinone, phthalocyanine or nitro series as recognized by the Colour Index, 2nd edition, 1956; $n$ is a small whole number having a value of form 1–4; R is a lower alkyl radical; X is a chlorine or bromine, and Y is a member selected from the group consisting of X, iodine, and $RSO_4$. The Z term, representing the dyestuff moiety, is free of ionogenic solubilizing groups.

The new water-soluble dyestuffs can be made by the interaction of one mole of a water-insoluble colorant of the azo, anthraquinone, phthalocyanine or nitro series, having at least one 2-haloethylthio group, with at least one mole per 2-haloethylthio group, of an alkylating agent RY wherein R and Y are as defined aforesaid.

The water-insoluble colorants of the azo series which are suitable for making the dyestuffs of the invention can be made in a variety of ways. One method is to diazotize an arylamine containing a 2-haloethylthio group and couple it with any suitable coupling component. Another method is to react an acylamino aryl mercaptan with ethylene oxide, then hydrolyze to form an arylamine containing at least one 2-hydroxyethylthio group. This intermediate can be diazotized and coupled with any suitable coupling component and thereafter reacted with hydrohalic acid or thionyl chloride to form a starting material useful in the invention. A third method is to react a nitro aromatic compound containing an active halogen atom attached to the aryl nucleus with monothioglycol and thereafter reduce the nitro group to an amino group to form an aryl amine containing a 2-hydroxyethylthio group. This intermediate is diazotized, coupled and converted to a halide as described hereabove. Still another method involves converting an aminoaryl mercaptan to its aminoaryl disulfide by air oxidation, diazotizing the aminoaryl disulfide and coupling it with any suitable coupler, reducing the disulfide group to a mercapto group with a reducing agent, such as sodium sulfide, and reacting the mercapto group thus obtained with an ethylene dihalide. A fifth method involves diazotization of any suitable arylamine which is free of 2-haloethylthio or 2-hydroxyethylthio groups, with a coupler containing at least one 2-haloethylthio or 2-hydroxyethylthio groups. A sixth method is to condense an acylamino aryl mercaptan with an ethylene dihalide, then hydrolyze to the aniline, which can be diazotized and coupled as described above.

The aminoaryl mercaptan used in the above reactions, if not commercially available, can be easily made from a nitro aromatic containing a reactive halogen atom by reacting it with sodium sulfide to obtain directly an aminoaryl mercaptan. Alternatively, an azo dye containing a primary aryl amino group is diazotized, reacted with an alkali metal xanthate, and the product hydrolyzed with aqueous alkali to the corresponding mercaptan.

Useful water-insoluble arylamines containing 2-haloethylthio groups include 4-aminophenyl 2-bromoethyl sulfide, 3-aminophenyl 2-bromoethyl sulfide, 2-aminophenyl 2-bromoethyl sulfide, 4-amino-2-chlorophenyl 2-bromoethyl sulfide, 4-amino-3-chlorophenyl 2-bromoethyl sulfide, 3-amino-4-chlorophenyl 2-bromoethyl sulfide, 4-amino-2-methylphenyl 2-bromoethyl sulfide, 4-amino-3-methylphenyl 2-bromoethyl sulfide, 4-amino-2-trifluoromethylphenyl 2-bromoethyl sulfide, 4-amino-2-nitrophenyl 2 - bromoethyl sulfide, 4-amino-2-nitrophenyl 2-bromoethyl sulfide, 4-amino-2-bromophenyl 2-bromoethyl sulfide, 4-amino-2-bromophenyl 2-bromoethyl sulfide, 4-amino-2-chloro-6-methylphenyl 2-bromoethyl sulfide, 4-amino-2-bromo-1-naphthyl 2-bromoethyl sulfide, 2-amino-3-bromo-1-naphthyl 2-bromoethyl sulfide, 4 - amino - 1 - anthraquinonyl 2-bromoethyl sulfide, 1-amino-2-anthraquinonyl 2-bromoethyl sulfide, 1-amino-4-hydroxy-2-anthraquinonyl 2-bromoethyl sulfide, 4-(4-aminophenyl)-azophenyl 2-bromoethyl sulfide, and the corresponding 2-chloroethyl derivatives of the aforementioned compounds. Also useful are 2-amino-4-nitrophenyl 2 - chloroethyl sulfide, 3 - amino - 4 - nitrophenyl 2-chloroethyl sulfide, 2 - amino - 3 - chloro-5-nitrophenyl 2-chloroethyl sulfide, 2-amino-3-hydroxy-4-nitrophenyl 2-chloroethyl sulfide, 3-(γ-aminobiphenyl) 2-chloroethyl sulfide, 4-amino-3-chloro-1-naphthyl 2-chloroethyl sulfide, 1-amino-2-naphthyl 2-chloroethyl sulfide, and the corresponding 2-bromoethyl sulfide derivatives thereof.

Coupling components which can be coupled with the 2-haloethylthio arylamines described hereabove include phenol, o-, m- and p-cresol, o-, m- and p-chlorophenol, o-, m- and p-bromophenol, catechol, resorcinol, o-, m- and p-methoxyphenol, o-, m- and p-ethoxyphenol, o-, m- and p-dimethylaminophenol, 1-naphthol, 2-naphthol, 6-hydroxytetralin, 5-hydroxytetralin, 6-ethyl-5-hydroxytetralin, 2,6-dimethyl-1-naphthol, 4,8-dimethyl-2-naphthol, 2-, 3-, 4-, 5-, 6-, 7- or 8-methyl-1-naphthol, 3-, 4-, 5-, 6-, 7- or 8-methyl-2-naphthol, 2-, 3-, 4-, 5-, 6-, 7- or 8-chloro-1-naphthol, 3-, 4-, 5-, 6-, 7- or 8-chloro-2-naphthol, 2-, 3-, 4-, 5-, 6-, 7- or 8-bromo-1-naphthol, 3-, 4-, 5-, 6-, 7- or 8-bromo-2-naphthol, 1-anthrol, 2-anthrol, 3-hydroxy-2-naphthamide, N-methyl-3-hydroxy-2-naphthamide, 3-hydroxy-2-naphthanilide, and those compounds of this series commonly known as the naphthols (CI 37505 to CI 37580), 3-hydroxy-2-naphthanilide,
5-oxo-1-phenyl-2-pyrazoline-3-carboxamide,
ethyl 5-oxo-1-phenyl-2-pyrazoline-3-carboxylate,
1-(m-aminophenyl)-3-methyl-5-pyrazolone,
1-(p-aminophenyl)-3-methyl-5-pyrazolone,
1-(m-chlorophenyl)-3-methyl-5-pyrazolone,
3-methyl-5-pyrazolone,
3-methyl-1-phenyl-5-pyrazolone,
3-methyl-1-(p-nitrophenyl)-5-pyrazolone,
3-methyl-1-(p-chlorophenyl)-5-pyrazolone,
3-methyl-1-(m-sulfamylphenyl)-5-pyrazolone,
3-methyl-1-(m-nitrophenyl)-5-pyrazolone,
acetoacetanilide,
o-acetoacetotoluidide,
2,4-acetoacetoxylidide,
o-acetoacetanisidide,
2,5-dimethoxyacetoacetanilide,
4-chloro-2,5-dimethoxyacetoacetanilide,
o-chloroacetanilide,
N,N-dimethylaniline,
N,N-diethylaniline,
N,N-di-n-propylaniline,
2-(N-ethylanilino)ethanol,
2-N-ethylanilino-1,2-propandiol,
2-(N-butylanilino)-ethanol,
2,2'-(m-chlorophenylimino)-diethanol,
2,2'-(m-toluidino)-diethanol,
3-(N-2-hydroxyethyl-m-toluidino)bispropionitrile,
1-sec-butyl-1,2,3,4-tetrahydro-7-methyl-3-quinolinol,
1,2,3,4-tetrahydrobenzo[h]-quinolin-3-ol,
2,4-quinolinediol, and
4-hydroxy-1-methylcarbostyril.

Useful arylamines bearing a 2-hydroxyethyl sulfide group which can be diazotized and coupled to any one of the aforementioned coupling components include 4-aminophenyl 2-hydroxyethyl sulfide, 3-aminophenyl 2-hydroxyethyl sulfide, 2-aminophenyl 2-hydroxyethyl sulfide, 4-amino-2-chlorophenyl 2-hydroxyethyl sulfide, 4-amino-3-chlorophenyl 2-hydroxyethyl sufide, 3-amino-4-chorophenyl 2-hydroxyethyl sulfide, 4-amino-2-methylphenyl 2-hydroxyethyl sulfide, 4-amino-3-methylphenyl 2-hydroxyethyl sulfide, 4-amino-2-trifluoromethylphenyl 2-hydroxyethyl sulfide, 4-amino-2-nitrophenyl 2-hydroxyethyl sulfide, 4-amino-2-bromophenyl 2-hydroxyethyl sulfide, 4-amino-2-chloro-6-methylphenyl 2-hydroxyethyl sulfide, 4-amino-2-bromo-1-naphthyl 2-hydroxyethyl sulfide, 2-amino-4-bromo-1-naphthyl 2-hydroxyethyl sulfide, 4-amino-1-anthraquinonyl 2-hydroxyethyl sulfide, 1-amino-2-anthraquinonyl 2-hydroxyethyl sulfide, 1-amino-4-hydroxy-2-anthraquinonyl 2-hydroxyethyl sulfide, 4-(4'-aminophenyl)-azophenyl 2-hydroxyethyl sulfide. Also useful are 2-amino-4-nitrophenyl 2-hydroxyethyl sulfide, 3-amino-4-nitrophenyl 2-hydroxyethyl sulfide, 2-amino-3-chloro-5-nitrophenyl 2-hydroxyethyl sulfide, 2-amino-3-hydroxy-4-nitrophenyl 2-hydroxyethyl sulfide, 2-amino-3-chloro-5-nitrophenyl 2-hydroxyethyl sulfide, 2-amino-3-hydroxy-4-nitrophenyl 2-hydroxyethyl sulfide, 3-(4-amino-biphenyl) 2-hydroxyethyl sulfide, 4-amino-3-chloro-1-naphthyl 2-hydroxyethyl sulfide, 1-amino-2-naphthyl 2-hydroxyethyl sulfide, and 4,7-bis(2-hydroxyethylthio)-1-naphthol. The hydroxyethyl group is then converted to a halo group as described hereabove to form compounds useful as starting materials in the invention.

Useful aminoaryl mercaptans which can be converted either to the 2-hydroxyethyl sulfide or 2-haloethyl sulfide containing water-insoluble aromatic amines by methods described hereabove include 4-aminothiophenol, 3-aminothiophenol, 2-aminothiophenol, 5-amino-2-hydroxythiophenol, 2-amino-4-nitrothiophenol, 2-amino-5-nitrothiophenol, 3-amino-4-nitrothiophenol, 2-amino-3-chloro-5-nitrothiophenol, 2-amino-3-hydroxy-5-nitrothiophenol, 2-amino-3,5-dinitrothiophenol, 4-amino-2-chlorothiophenol, 4-amino-3-chlorothiophenol, 3-amino-4-chlorothiophenol, 2-amino-4-chlorothiophenol, 4-amino-2-methylthiophenol, 4-amino-3-methylthiophenol, 4-amino-2-trifluoromethyl-thiophenol, 4-amino-2-nitrothiophenol, 4-amino-2-chloro-6-methylthiophenol, 4-amino-1-mercaptonaphthalene, 2-amino-1-mercaptonaphthalene, 4-amino-1-mercaptoanthraquinone, 1-amino-2-mercaptoanthraquinone, and 1-amino-4-hydroxy-2-mercaptoanthraquinone. The use of the acyl derivatives of the aforementioned compounds is sometimes preferable to the use of an aryl mercaptan containing an unprotected amino group.

Suitable arylamines free of 2-haloethylthio or 2-hydroxyethylthio groups which are coupled with a coupler containing at least one 2-haloethylthio or 2-hydroxyethylthio group include aniline, o-, m- and p-toluidine, 2,4- and 2,5-xylidine,
o-, m- and p-anisidine,
o-, m- and p-phenetidine,
o-, m- and p-chloroaniline,
o-, m- and p-bromoaniline,
o-, m- and p-fluoroaniline,
2,4- and 2,6-dichloroaniline,
trichloroaniline,
1-naphthylamine,
2-naphthylamine,
5-aminotetralin,
6-aminotetralin,
2-methyl-1-naphthylamine,
3-methyl-1-naphthylamine,
4-methyl-1-naphthylamine,
5-methyl-1-naphthylamine,
6-methyl-1-naphthylamine,
7-methyl-1-naphthylamine,
8-methyl-1-naphthylamine,
1-methyl-2-naphthylamine,
3-methyl-2-naphthylamine,
4-methyl-2-naphthylamine,
5-methyl-2-naphthylamine,
6-methyl-2-naphthylamine,
7-methyl-2-naphthylamine,
7-ethyl-1-naphthylamine,
2,3-dimethyl-1-naphthylamine,
2,6-dimethyl-1-naphthylamine,
1,7-dimethyl-2-naphthylamine,
1,4-dimethyl-2-naphthylamine,
3,6-dimethyl-2-naphthylamine,
4-phenyl-1-naphthylamine,
6-phenyl-1-naphthylamine,
7-phenyl-1-naphthylamine,
6-phenyl-2-naphthylamine,
2-chloro-1-naphthylamine,
3-chloro-1-naphthylamine,
4-chloro-1-naphthylamine,
5-chloro-1-naphthylamine,
6-chloro-1-naphthylamine,
7-chloro-1-naphthylamine,
8-chloro-1-naphthylamine,
1-chloro-2-naphthylamine,
3-chloro-2-naphthylamine,
4-chloro-2-naphthylamine,
5-chloro-2-naphthylamine,
x-halo-y-methyl-1-naphthylamine,
x-halo-y-methyl-2-naphthylamine,
x,y-dihalo-1-naphthylamine,
x,y-dihalo-2-naphthylamine,
1- or 2-aminoanthraquinone,
o-, m- and p-aminobenzanilide,
o-, m- and p-aminoacetanilide,
2- and 4-aminodiphenyl ether,
sulfanilamide,
metanilamide,
orthanilamide,
$N_1$-methylsulfanilamide, $N_1,N_1$-dimethylsulfanilamide,
$N_1$-methylmetanilamide,
o-, m- and p-aminoacetophenones,
o-, m- and p-ethylaniline,
o-, m-, and p-isopropylaniline,
dehydrothiotoluidine,
primuline base,
4-benzamide-2,5-diethoxyaniline,
pseudocumidine,
4-amino-2-nitroacetanilide,
4-amino-N-ethylacetanilide,
4-amino-2,5-dimethoxyacetanilide,
p-amino-N-butylbenzamide,
4-amino-5-chloro-o-benzanisidide,
3-chloro-o-toluidine,
3-bromo-o-toluidine,
4-bromo-o-toluidine,
4-chloro-o-toluidine,
2-chloro-m-toluidine,
4-chloro-m-toluidine,
2-bromo-m-toluidine,
4-bromo-m-toluidine,
2-bromo-p-toluidine,
3-bromo-p-toluidine,
2-chloro-p-toluidine,
3-chloro-p-toluidine,
5-methyl-o-anisidine,
2,5-dimethoxyaniline,
2,5-diethoxyaniline,
o-, m- and p-aminophenol,
2-, 3- or 4-aminodiphenyl,
5-amino-o-toluenesulfonanilide,
monobenzoylbenzidine,
N-phenyl-o-phenylenediamine,
4,4'-diaminodiphenylamine,
N,N-diethyl-p-phenylene diamine,
N,N-dimethyl-p-phenylenediamine and
N-ethyl-p-phenylene diamine.

Coupling components containing at least one 2-haloethylthio or 2-hydroxyethylthio group which may be coupled with one of the arylamines, free of such groups, or, alternatively, with an arylamine already containing one or more of such groups, include 3-(methylamino)phenyl 2-bromoethyl sulfide,
3-dimethylaminophenyl 2-bromoethyl sulfide,
3-[bis(2-hydroxyethyl)amino]phenyl 2-bromoethyl sulfide,
3-(methylamino)phenyl 2-chloroethyl sulfide,
3-dimethylaminophenyl 2-chloroethyl sulfide,
3-[bis(2-hydroxyethyl)amino] 2-chloroethyl sulfide,
3-dimethylaminophenyl 2-hydroxyethyl sulfide,
3-(methylamino)phenyl 2-hydroxyethyl sulfide,
3-[bis(2-hydroxyethyl)amino]phenyl 2-hydroxyethyl sulfide,
6-hydroxy-1-naphthyl 2-bromoethyl sulfide,
4-hydroxy-1-naphthyl 2-bromoethyl sulfide,
7-hydroxy-2-naphthyl 2-bromoethyl sulfide,
3-hydroxy-1-naphthyl 2-bromoethyl sulfide,
2-hydroxy-5-methylphenyl 2-bromoethyl sulfide,
3-hydroxyphenyl 2-bromoethyl sulfide,
2-aminophenyl 2-bromoethyl sulfide,
2-methylaminophenyl 2-bromoethyl sulfide,
2-dimethylaminophenyl 2-bromoethyl sulfide,
2-hydroxyphenyl 2-bromoethyl sulfide,
1-(4-bromoethylthio)phenyl-3-methyl-5-pyrazolone and the corresponding 2-chloroethyl and 2-hydroxyethyl derivatives thereof.

The water-insoluble azo colorants useful in the invention also include those containing more than one azo group. Useful disazo compounds may be formed by the tetrazotization of an aromatic diamine containing two primary amino groups and coupling the tetrazo compound thus formed with two moles of one of the above-defined coupling components. Either the diazonium salt or one of the coupling components must contain either a 2-haloethylthio or 2-hydroxyethylthio group. Suitable aromatic diamines containing a 2-haloethylthio group include 3,3'-diaminobiphenyl-4,4'-bis(2-bromoethyl sulfide), 3,3'-diaminobiphenyl-4,4'-bis(2-chloroethyl sulfide), and 3,3'-diaminobiphenyl-4,4'-bis(2-hydroxyethyl sulfide). Suitable aromatic diamines free of 2-haloethylthio or 2-hydroxyethylthio groups include benzidine, 3,3'-dimethoxybenzidine, 3,3'-dichlorobenzidine and 4,4'-diaminostilbene.

Another method of forming the disazo or polyazo compounds useful in the invention involves the use of the appropriate above-described process with aromatic amines or diamines containing azo groups.

Useful starting materials of the anthraquinone series can be made by any one of the following methods: (1) reaction of a mercapto anthraquinone with ethylene oxide to form an anthraquinonyl 2-hydroxyethyl sulfide which can be converted to a 2-haloethyl sulfide by reaction with the appropriate hydrohalic acid or thionyl halide, (2) reaction of a mercapto anthraquinone with ethylene chlorohydrin to form anthraquinonyl 2-hydroxyethyl sulfide, (3) reaction of a mercapto anthraquinone with an ethylene dihalide to form an anthraquinonyl 2-haloethyl sulfide directly, or (4) reaction of an anthraquinone containing a reactive halogen with monothioglycol to form an anthraquinonyl 2-hydroxyethyl sulfide, which is converted to the 2-haloethyl sulfide as described hereabove.

Suitable anthraquinonyl sulfides (the ultimate product of the reactions described hereabove) include 1- or 2-anthraquinonyl 2-chloroethyl sulfide,
1-amino-4-hydroxy-2-anthraquinonyl 2-chloroethyl sulfide,
1-amino-4-arylamino-2-anthraquinonyl 2-chloroethyl sulfide,
1-amino-4-methylamino-2-anthraquinonyl 2-chloroethyl sulfide,
1,4-diamino-2-anthraquinonyl 2-chloroethyl sulfide,
1,5-diamino-4,8-anthraquinonylene bis(2-chloroethyl sulfide),
1,5-diamino-2-anthraquinonyl 2-chloroethyl sulfide,
1,5-diamino-2,6-anthraquinonylene bis(2-chloroethyl sulfide),
1,5-diamino-4,8-dihydroxy-2,6-anthraquinonylene bis(2-chloroethyl sulfide),
1,8-diamino-4,5-dihydroxy-3,6-anthraquinonylene bis(2-chloroethyl sulfide),
1,5-diamino-4,8-dihydroxy-3,7-anthraquinonylene bis(2-chloroethyl sulfide),
1,5-diamino-4,8-dianilino-2,6-anthraquinonylene bis(2-chloroethyl sulfide),
1,8-diamino-4,5-dihydroxy-3,6-anthraquinonylene bis(2-chloroethyl sulfide),
1,8-diamino-4,5-dianilino-2,7-anthraquinonylene bis(2-chloroethyl sulfide),
1,8-diamino-4,5-bis(p-toluidinoamino)-2,7-anthraquinonylene bis(2-chloroethyl sulfide),
1,5-dihydroxy-2-anthraquinonyl 2-chloroethyl sulfide,
1,5-dihydroxy-2,5-anthraquinonylene bis(2-chloroethyl sulfide),
1-amino-4- (or 2-, 5- or 8-)anthraquinonyl 2-chloroethyl sulfide,
1-hydroxy-2- (or 4-, 5- or 8-)anthraquinonyl 2-chloroethyl sulfide,
1-methylamino-4- (or 2-, 5- or 8-)anthraquinonyl 2-chloroethyl sulfide,
1-acetylamino-4- (or 2-, 5- or 8-)anthraquinonyl 2-chloroethyl sulfide,
2-chloroacetyl-4- (or 2-, 5- or 8-)anthraquinonyl 2-chloroethyl sulfide,
1-propionyl-4- (or 2-, 5- or 8-)anthraquinonyl 2-chloroethyl sulfide,
1-benzoylamino-4- (or 2-, 5- or 8-)anthraquinonyl 2-chloroethyl sulfide,
p-chlorobenzoylamino-4-(or 2-, 5- or 8-)anthraquinonyl 2-chloroethyl sulfide, 1-phthaloylamino-4-(or 2-, 5- or 8-(anthraquinonyl 2-chloroethyl sulfide,
1-(2-chloroacetylamino)-4-(or 2-, 5- or 8-)anthraquinonyl 2-chloroethyl sulfide and the corresponding 2-bromoethyl and 2-hydroxyethyl sulfides.

Other useful compounds of the anthraquinone series include those in which the 2-haloethylthio group is attached to an arylene group attached to an anthraquinone nucleus by an imino linkage. Compounds of this type are made by condensing, for example, an approximately substituted aniline with a halo- or dihaloanthraquinone. Such compounds include 1-amino-4-[4-(2-chloroethylthio)anilino]anthraquinone,
1,8-dihydroxy-5-nitro-4-[4-(2-chloroethylthio)anilino]anthraquinone,
1,5-dihydroxy-8-nitro-4-[4-(2-chloroethylthio)anilino]anthraquinone, and the corresponding 2-bromoethyl sulfide derivatives of the foregoing compounds.

Useful compounds of the phthalocyanine series are made from the tetramercaptophthalocyanines, which are in turn made either (1) by the reduction of a tetrachlorosulfonated phthalocyanine or (2) by diazotization of the tetraminophthalocyanine, followed by reaction with an alkaline metal xanthate solution, and subsequent hydrolysis in alkaline solution. An ethylene dihalide will react with each of the mercapto groups to give the 2-haloethyl-substituted phthalocyanine. Useful mercaptan intermediates of the phthalocyanine series include 4,4',4'',4'''-tetramercaptophthalocyanines of aluminum, chromium, magnesium, cobalt, nickel, iron or zinc, as well as the corresponding metal-free compounds and mono-, di- and trimercapto substituted phthalocyanines.

Useful compounds of the nitro series are those made from substituted diphenyl amines and phenylnaphthalenes, such as 2,4-dinitro-4'-(2-bromoethylthio)diphenylamine, 4-nitro-4'-(2-bromoethylthio)diphenylamine, 2-chloro-4-nitro-4'-(2-bromoethylthio)diphenylamine, etc., and the corresponding 2-chloroethylthio derivatives of these compounds.

Alkylating agents from which the dyestuffs of the invention can be made include dimethyl sulfate, diethyl sulfate, di-n-butyl sulfate, methyl chloride, methyl bromide, methyl iodide, ethyl bromide, propyl chloride, butyl iodide, and the like.

The dyestuffs of the invention are formed from the water insoluble colorants containing a 2-haloethyl sulfide group according to the following equation:

In the above equation Z, R, X, Y and $n$ have the values given aforesaid. The reaction is conducted in a suitable inert solvent, such as an ether, e.g., dioxane or diethyl ether; an aromatic hydrocarbon, e.g., benzene or toluene; or a lower alkanol at a temperature between about 25° C. and the reflux temperature of the reaction mixture. The product sulfonium salt is solvent-insoluble and can be easily recovered by filtration. The filter cake is washed if desired with ether, alcohol, or acetone and is oven-dried. Alternatively, the reaction may be conducted using an excess of alkylating agent as a reaction medium, in which case the product sulfonium salt can be isolated by adding a non-solvent, e.g., acetone; or an inorganic salt, e.g. sodium chloride; and filtering off the precipitated product.

The new dyestuffs of the invention are especially suited for the coloration of cellulosic textile materials such as cotton, linen and viscose rayon, although they also may be effectively applied to silk, wool, nylon and the like.

The dyestuffs are applied by treating the textile material in an aqueous solution (which may be a thickened printing paste) of the dyestuff in the presence of an acid-binding agent, for example, sodium hydroxide, sodium phosphate or sodium carbonate. The acid-binding agent may be added to the dye bath either prior to, simultaneously with, or after the addition of the dyestuff.

The dyestuff solution may contain commonly used dye bath adjuvants, such as sodium chloride, sodium sulfate, sodium alginate, urea or water-soluble alkyl ethers of cellulose.

The printing paste may contain commonly used adjuvants, such as urea, and thickening agents, e.g., methyl cellulose, starch and locust bean gum and sodium alginate.

Dyeing in the presence of the acid-binding agent is preferably carried out at elevated temperatures, for example, at temperatures between 60° C. and the boiling point of the dyestuff solution, in order to improve the exhaustion and fixation of the dyestuff.

The textile material printed with printing paste containing an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent, i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature, for example, at 100° C. or higher, for a short period of time after application of the dyestuff and acid-binding agent to fix the dyestuff on the textile material.

The above technique may be modified by substituting for the acid-binding agent a substance which on heating or steaming generates an acid-binding agent. Such substances include alkali metal bicarbonates, which on heating yield alkali metal carbonates.

The fastness to washing or subsequent wet processing of the colorations produced using my new dyestuffs is improved by a scouring treatment, e.g., applying a hot aqueous solution of soap and sodium carbonate followed by rinsing in hot water prior to drying.

The new dyestuffs also may be applied to silk, wool, regenerated protein, nylon and modified polyacrylonitrile textile materials by using the conventional dyeing methods for those textile materials; i.e., dyeing from weakly acid dye bath solutions, for example, dyestuff solutions containing acetic acid or ammonium sulfate at a temperature above 80° C. When dyeing proteinaceous fibers in conjunction with an acidic agent, it is preferable to use a temperature between 80° C and 100° C.

My invention is further illustrated by the following examples:

EXAMPLE I

1,8-bis(2-hydroxyethylthio)anthraquinone

At 40° C., 25.8 g. (0.40 mole) of potassium hydroxide pellets (97.0% pure) is stirred into a solution of 34.3 g. (0.44 mole) of 2-mercaptoethanol in 700 ml. of 95% ethanol. When the pellets have dissolved there is added 55.4 g. (0.20 mole) of 1,8-dichloroanthraquinone, and the mixture is heated to reflux. Another 250 ml. of 95% ethanol is added to thin out the suspension. After 12 hours under reflux, the mixture is cooled, filtered, and the solid washed twice with 200 ml. of a 1:1 (by volume) solution of alcohol in water, then with 31 ml. of water. The product is dried at 55° C. under vacuum to give 55.6 g. (77.2% yield) of orange solid, M.P. 201–206° C.

*Analysis.*—Calculated for $C_{18}H_{16}O_4S_2$ (360.4): S, 17.8; found: S, 16.3. The material is used without further purification.

EXAMPLE II

1,8-bis(2-chloroethylthio)anthraquinone

At 25–28° C. and during 95 minutes, a solution of 40 g. (0.24 mole) of thionyl chloride (distilled from quinoline and linseed oil) in 150 ml. of chloroform is added to a stirred suspension of 36.0 g. (0.10 mole) of 1,8-bis(2'-hydroxyethylthio)anthraquinone in 200 ml. of chloroform. After stirring overnight, the solid is filtered off and washed with 85 ml. of fresh chloroform, then dried at 50° C. under vacuum. There is obtained 25.2 g. of crude product, M.P. 180–199° C. (another 14.2 g., M.P. 173–180° C. is recovered by evaporating the filtrate). After heating 15.5 g. of the material for one hour with 100 ml. of refluxing thionyl chloride (not purified), holding overnight at room temperature, filtering, washing the solid with 100 ml. of petroleum ether and drying first over sodium hydroxide, then at 60° C. under vacuum, there is obtained 8.2 g. of purer product, M.P. 200–202° C.

*Analysis.*—Calc'd for $C_{18}H_{14}Cl_2O_2S_2$ (297.3): Cl, 17.8; found: Cl, 16.6.

EXAMPLE III

Methyl sulfonium salt of 1,8-bis(2-chloroethylthio)anthraquinone

A mixture of 4.0 g. (0.010 mole) of 1,8-bis(2-chloroethylthio)anthraquinone and 50 cc. of dimethyl sulfate is heated to 100° C. for one hour. After cooling, the mixture is diluted with acetone. The oil which separates is treated with ether. On standing, the bis-sulfonium salt separates; M.P. 148–150° C.

EXAMPLE IV

A dyeing stable to washing at 70–75° C. for 45 minutes is obtained by padding 80″ x 80″ print cloth with a 1% solution of the bis-methyl sulfonium salt of 1,8-bis(2-chloroethylthio)anthraquinone in water, drying, then padding with a solution of five grams of sodium hydroxide and 300 grams of sodium chloride per liter and steaming for 60 seconds.

EXAMPLE V

A dyeing stable to washing at 70–75° C. for 45 minutes is obtained by padding 80″ x 80″ print cloth with a 1% solution of the bis-methyl sulfonium salt of 1,8-bis(2-chloroethylthio)anthraquinone in water, drying, then padding with a solution of 20 g. of sodium carbonate and 200 g. of urea per liter, drying, and holding the cloth at 140–145° C. for 5 minutes.

EXAMPLE VI

A mixture of 33.3 g. (0.10 mole) of 1,5-diamino-2-(2-chloroethylthio)anthraquinone and 78 g. (0.5 mole) of iodoethane is stirred at 70° C. until a sample of solid is essentially entirely soluble in water. The mixture is cooled and added to a large excess of acetone. The product is filtered off, washed with acetone until the washings are essentially colorless, and dried at 50° C. under vacuum. There is obtained a 91% yield of scarlet dye.

EXAMPLE VII

The procedure of Example IV is followed using a 1% solution of the dye of Example VI. The fastness of the dyeing to soaping is once again greater than that of the colorant from which the new dyestuff is prepared.

EXAMPLE VIII

The procedure of Example III is repeated using 1-amino-4-anilino-2-(2-chloroethylthio)anthraquinone as a starting material. There is obtained in good yield a reddish-blue dye.

EXAMPLE IX

The procedure of Example III is repeated using 1-amino-4-(2-chloroethylthio)anthraquinone as a starting material. There is obtained in good yield a red dye.

EXAMPLE X

The procedure of Example III is repeated using 1-benzamido-4-(2-chloroethylthio)anthraquinone as a starting material. There is obtained in good yield an orange dye.

EXAMPLE XI

The procedure of Example III is repeated using 2,6-bis(2-chloroethylthio)-4,8-diaminoanthrarufin as a starting material. There is obtained in good yield a violet dye.

EXAMPLE XII

The procedure of Example III is repeated using 1,4-bis(p-toluidino)-6-(2-chloroethylthio)anthraquinone as a starting material. There is obtained in good yield a bluish-green dye.

EXAMPLE XIII

The procedure of Example III is repeated using 1-hydroxy-4-methylamino-2-(2-chloroethylthio)anthraquinone as a starting material. There is obtained in good yield a violet dye.

EXAMPLE XIV

The procedure of Example III is repeated using 1-amino-4-hydroxy-2-(2-chloroethylthio)anthraquinone as a starting material. There is obtained in good yield a reddish-violet dye.

EXAMPLE XV

A stirred mixture of 19.3 g. (0.050 mole) of 1-[4-(2-bromoethylthiophenylazo)]-2-naphthol, 25 g. (0.20 mole) of dimethyl sulfate, and 100 ml. of dioxane is held at 95° C. until the solid is soluble in water. After cooling, the mixture is added to 500 ml. of acetone. The product is filtered off, washed with acetone until the washings are nearly colorless, then dried at 50° C. under vacuum. There is obtained an 87% yield of orange dye.

EXAMPLE XVI

The procedure of Example IV is followed using a 1% solution of the dye of Example XV. The fastness of the dyeing to soaping is once again greater than that of the colorant from which the new dyestuff is prepared.

EXAMPLE XVII

A mixture of 13 g. (0.020 mole) of the compound 4,4'-bis(2-chloroethylthio)benzidine⇒O-chlorophenol (2 moles), 50 g. (0.40 mole) of dimethyl sulfate and 100 ml. of dioxane is stirred and heated to 95° C. until the solid is almost entirely water-soluble. The mixture is cooled and poured into 250 ml. of acetone. The product is filtered off, washed with acetone until the washings are almost colorless, then dried at 50° C. under vacuum. There is obtained an 82% yield of violet dye.

EXAMPLE XVIII

The procedure of Example IV is followed using a 1% solution of the dye of Example XVII. The fastness of the dyeing to soaping is once again greater than that of the colorant from which the new dyestuff is prepared.

EXAMPLE XIX

The procedure of Example XVII is repeated using as dyestuff the product 2-methoxy-4-(2-chloroethylthio)aniline→2-naphthol. There is obtained in good yield a bordeaux dye.

EXAMPLE XX

The procedure of Example XVII is repeated using as a dyestuff the product 2-methoxy-4-(2-chloroethylthio)aniline→o-ansidine→2-naphthol. There is obtained in good yield a red dye.

EXAMPLE XXI

The procedure of Example XVII is repeated using as a dyestuff the product 4 - nitroaniline→6 - (2 - chloroethylthio)-2-naphthol. There is obtained in good yield an orange dye.

EXAMPLE XXII

The procedure of Example XVII is repeated using as a dyestuff the product 7 - (2 - chloroethylthio) - 1 - naphthylamine→3-hydroxy-2-naphthanilide. There is obtained in good yield a bluish-red dye.

EXAMPLE XXIII

The procedure of Example XVII is repeated as a dyestuff the product 4 - (2 - chloroethylthio) - 1 - naphthylamine→7 - (2 - chloroethylthio) - 1 - naphthylamine, followed by acetylation of the amino group. There is obtained in good yield a violet dye.

EXAMPLE XXIV

Copper tetra(4)mercaptophthalocyanine is reacted with ethylene oxide to form the tetra(2-hydroxyethylthio)phthalocyanine which, by chlorination with thionyl chloride, gives rise to copper tetra(4)-2-chloroethylthiophthalocyanine. A mixture of 0.20 mole of this product, 120 g. (1.0 mole) of dimethyl sulfate and 200 ml. of dioxane is stirred and heated to 95° C. until the solid is soluble in water. The mixture is cooled, added to 500 ml. of acetone, and the precipitated product is filtered off, washed well with acetone, and dried at 50° C. under vacuum. There is obtained a blue water-soluble dye in excellent yield.

EXAMPLE XXV

The procedure of Example IV is followed using a 1% solution of the dye of Example XXIV. The fastness of the dyeing to soaping is once again greater than that of the colorant from which the new dyestuff is prepared.

EXAMPLE XXVI

A mixture of 50 ml. of iodoethane and 4 g. (0.01 mole) of 2,4 - dinitro - 4' - (2 - bromoethylthio)diphenylamine is stirred at 25° C. until a sample of solid is nearly entirely soluble in water. The mixture is added to 200 ml. of acetone. The precipitated product is filtered off, washed with acetone until the washings are nearly colorless, then dried at 50° C. under vacuum. There is obtained a 94% yield of yellow dye.

EXAMPLE XXVII

The procedure of Example IV is followed using a 1% solution of the dye of Example XXVI. The fastness of the dyeing to soaping is once again greater than that of the colorant from which the new dyestuff is prepared.

I claim:
1. A dyestuff of the formula:

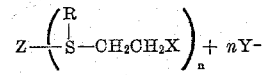

wherein Z is a water-insoluble dyestuff moiety selected from the group consisting of azo, anthraquinone, phthalocyanine and nitro; R is lower alkyl; X is chlorine or bromine; Y is a member selected from the group consisting of X, iodine, and $RSO_4$, and $n$ is an integer having a value of from 1 to 4, the thio radical being directly linked to an aromatic carbon atom of the Z moiety.

2. A dyestuff of claim 1 wherein Z is azo, $n$ is 1, X is chlorine and Y is iodine.

3. A dyestuff of claim 1 wherein Z is anthraquinone, $n$ is 2, X is chlorine and Y is methyl sulfate.

4. A dyestuff of claim 1 wherein Z is phthalocyanine, $n$ is 4, X is chlorine and Y is bromine.

5. A dyestuff of claim 1 wherein Z is nitro, $n$ is 1, X is chlorine and Y is chlorine.

References Cited by the Examiner
UNITED STATES PATENTS

| | | | |
|---|---|---|---|
| 1,710,992 | 4/1929 | Kranzlein et al. | 260—378 |
| 2,807,630 | 9/1957 | Jenny | 260—369 |
| 2,989,561 | 6/1961 | Neesby et al. | 260—514 XR |
| 2,992,240 | 7/1961 | Lodge | 260—381 XR |
| 3,078,259 | 2/1963 | Hatch et al. | 260—379 XR |

CHARLES B. PARKER, *Primary Examiner.*

R. J. FINNEGAN, F. D. HIGEL, *Assistant Examiners.*